United States Patent [19]

Londa et al.

[11] Patent Number: 5,684,117
[45] Date of Patent: Nov. 4, 1997

[54] FLAME RETARDANT POLYKETONE POLYMER BLEND

[75] Inventors: Michelle Londa, Sugar Land; Randall Power Gingrich, Houston, both of Tex.

[73] Assignee: Shell Oil Company, Houston, Tex.

[21] Appl. No.: 543,664

[22] Filed: Oct. 16, 1995

[51] Int. Cl.$^6$ ....................................................... C08G 6/00
[52] U.S. Cl. ........................ 528/220; 528/394; 528/395; 528/425; 525/471; 524/405; 524/424; 524/425; 524/427; 524/432
[58] Field of Search ............................ 528/220, 425, 528/394; 525/471; 524/405, 424, 425, 427, 432

[56] References Cited

U.S. PATENT DOCUMENTS

| | | |
|---|---|---|
| 4,761,449 | 8/1988 | Lutz . |
| 4,885,328 | 12/1989 | Danforth et al. . |
| 4,921,897 | 5/1990 | Danforth et al. . |
| 4,935,304 | 6/1990 | Danforth ............................. 428/423.1 |

*Primary Examiner*—James J. Seidleck
*Assistant Examiner*—Duc Truong
*Attorney, Agent, or Firm*—Todd F. Volyn

[57] ABSTRACT

The Comparative Tracking Index of a flame retardant polyketone blend of polyketone polymer and glass filler is improved by formulating the flame retardant as a mixture of alkaline earth metal hydroxide or carbonate and zinc compound.

5 Claims, No Drawings

FLAME RETARDANT POLYKETONE POLYMER BLEND

FIELD OF THE INVENTION

This invention is related to polyketone polymers. More particularly, the invention relates to flame retardant polyketone polymers blends.

BACKGROUND OF THE INVENTION

Polymers of carbon monoxide and ethylenically unsaturated hydrocarbons which are commonly called polyketones have been known and available for some time. High molecular weight linear alternating polyketones are of considerable interest because they exhibit a good overall set of physical properties. This class of polymers is disclosed in numerous U.S. patents assigned to Shell Oil Company and is exemplified by U.S. Pat. Nos. 4,880,865 and 4,818,811 which are incorporated herein by reference.

These polymers are relatively high molecular weight materials having established utility as premium thermoplastics in the production of shaped articles such as containers for food and drink and parts for the automotive industry. These articles and applications can be produced by processing the polyketone polymer according to well known methods. Certain mechanical properties of polyketones can be improved through blending or the addition of additives to the material. For example, the stiffness and heat resistance of polyketones are improved by the addition of glass fibers to the material.

The rise of the electronics industry has placed a premium on the development of polymers which can be used to support electrical circuitry. The polymers so used should not be unfavorably affected by their proximity to changing electrical fields and currents nor should their intrinsic properties unfavorably affect the circuitry about which the polymer is exposed. This can be best expressed by considering a simple electrical circuit such as the emplacement of two electrical conductors supported on a polymer support which maintains them at some finite separation. A potential difference is found between the two conductors. In such a case, among other desirable features of the material, the polymer must physically retain the separation of the two conductors to avoid a short circuit.

Exposing the polymer to a nonsterile environment subjects it to the deposition of any number of materials on its surface. As these materials become affixed to the surface of the polymer they cause a decrease in surface resistance. This enables a current to flow and thereby generates heat at the point about the deposition. Some areas may have considerably more deposits than others which can lead to voltage gradients which ultimately result in surface discharges. Such surface discharges produce very high temperatures at the point at which they occur and thereby erode the surface. This erosive action/effect is called tracking.

One method for comparing the susceptibility of a material to tracking is the Comparative Tracking Index (CTI). The CTI of a material is defined as the numerical value of the voltage (up to 600 V) which will cause failure by tracking when the number of drops of contaminant required to cause failure is equal to 50. Many of the most significant electrical and electronic applications of polymers require a CTI greater than 400 V.

Flammability is another important consideration in applying particular polymers in electrical or electronic uses. Many polymers and polymer blends must be modified by the addition of a flame retardant to attain the desired level of resistance to flammability. For example, U.S. Pat. No. 4,761,449 proposes the addition of an alkaline earth metal carbonate to polyketone as a flame retardant blend. U.S. Pat. No. 4,885,328 proposes the use of magnesium hydroxide as the flame retardant. U.S. Pat. No. 4,921,897 proposes the addition of zinc borate or barium borate as flame retardants for polyketones.

Unfortunately, a combination of additives to a polymer do not necessarily uniformly improve the properties of the polymer. For example, untilled, glass reinforced, and unreinforced flame retarded polyketones possess CTIs greater than 600 V. This is generally considered to be superior performance. When polyketones, glass fibers, and flame retardant are combined the material may exhibit a CTI as low as 250 V. The addition of other additives such as pigments also injects some uncertainty into the overall set of physical properties that the polymer will ultimately display.

Glass filled flame retarded polyketones having CTIs in the range found useful for electrical end uses would greatly contribute to the range of applications for such polymer blends. Such polyketone blends would be especially beneficial if they could obviate the need for one or more other additives such as pigments. Such materials would be useful in electrical connectors, as supporting materials and fasteners for electrical circuitry, and as insulation for wires among other applications.

SUMMARY OF THE INVENTION

In one aspect of this invention a glass filled polyketone polymer comprising a major amount of polyketone polymer, a minor amount of glass, and a minor amount of flame retardant mixture is presented.

In another aspect of this invention the flame retardant mixture comprises a minor amount of a nonhalogenated flame retardant, such as an alkaline earth metal hydroxide or an alkaline earth metal carbonate, and a minor amount of a zinc oxide or zinc containing derivative.

In another aspect of the invention the polymer blend is from about 40 to 70 wt % polyketone, about 10 to 30 wt % is comprised of glass filler, about 15 to 50 wt % is comprised of flame retardant mixture In yet another aspect of the invention the polymer also comprises a minor amount of fatty acid or derivative thereof.

A method of improving the CTI of a polyketone polymer blend of polyketone, glass filler, and a flame retardant mixture is presented.

DETAILED DESCRIPTION

It has now been found that the addition of certain flame retardant mixtures to polyketone polymer blends comprising polyketone polymer and minor amounts of glass fillers improves the CTI of such blends. This is particularly true where the flame retardant mixtures are comprised of alkaline earth metal hydroxides or carbonates and a zinc oxide or a zinc containing derivative thereof. It has also been found that the flame retardant mixture of this invention may be used as a pigment for the polyketone polymer.

The blends of this invention may also incorporate other common polymers additives. For instance, fillers, extenders, lubricants, pigments, plasticizers, and other polymeric materials can be added to the compositions to improve or otherwise alter the properties of the composition. In general, the practice of this invention involves suitably contacting sufficient quantities of the useful material to form the inventive blend.

The polyketone polymers which are employed as the major component of the inventive polymer blend are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

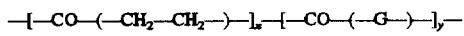

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the $-[-CO-(-CH_2-CH_2-)-]-$ units and the $-CO-(-G-)-$ units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g.

Preferred methods for the production of the polyketone polymers are illustrated by U.S. Pat. Nos. 4,808,699 and 4,868,282 to Van Broekhoven, et. al. which issued on Feb. 28, 1989 and Sep. 19, 1989 respectively and are incorporated herein by reference. U.S. Pat. No. 4,808,699 teaches the production of linear alternating polymers by contacting ethylene and carbon monoxide in the presence of a catalyst comprising a Group VII metal compound, an anion of a nonhydrohalgenic acid with a pKa less than 6 and a bidentate phosphorous, arsenic or antimony ligand. U.S. Pat. No. 4,868,282 teaches the production of linear random terpolymers by contacting carbon monoxide and ethylene in the presence of one or more hydrocarbons having an olefinically unsaturated group with a similar catalyst.

The blends of this invention incorporate glass fibers for reinforcement. The term "glass" is employed within its conventional meaning to indicate that class of complex metal silicates which are commonly referred to as glasses. Although the addition of rare earth metal oxides or transition metal oxides to other metal silicates on occasion will produce a glass of exotic properties, the glass from which the glass fiber of the invention is produced is the more common alkali metal silicate glass, particularly a borosilicate glass.

Fibers produced of such glass are conventional and are commercially available from a large number of sources. The fibers are useful as reinforcements for polymeric products and are commercially used as such. Short, chopped glass fibers with a circular cross section are preferred. For example, fibers ranging in diameter from about $2 \times 10^{-4}$ to $8 \times 10^{-4}$ inch and from about 0.1 to 0.5 inches can be used with good results. The glass fibers are preferably obtained from the manufacturer with a surface treatment compatible with the polyketone polymer, such as a polyurethane sizing. Preferred glass fibers are "OCF 408BC" brand chopped glass fibers available from Owens-Corning, Inc. This glass fiber is present in the blends of this invention in quantifies comprising between about 5 and 40 wt % (based on total weight of the blend). It is preferred that the range be between about 7 and 30 wt %. Between about 11 and 25 wt % is most preferred.

The flame retardant mixtures of this invention are comprised of two components: an alkaline earth metal hydroxide (or an alkaline earth metal carbonate) component and a zinc component. By alkaline earth metal hydroxide or carbonate is meant a hydroxide or carbonate of a metal of group IIA of the Periodic Table of Elements. While hydroxides of beryllium, magnesium, calcium, strontium, and barium are suitable, the preferred alkaline earth metal hydroxide component is magnesium hydroxide. Most preferred is the magnesium hydroxide composition commercially available as "MAGNFIN" from Martinswerk GmbH. The preferred alkaline earth metal carbonate is partially hydrated magnesium calcium carbonate. Most preferred is the partially hydrated magnesium calcium carbonate composition commercially available as "ULTRACARB" from Microfine Minerals Limited.

The zinc component is preferably a compound of zinc borate or zinc oxide. Zinc borate is most preferred. The typical composition of zinc borate is $xZnO \cdot yB_2O_3$, and is usually available in the hydrated form. A preferred zinc borate has the formula $2ZnO \cdot 3B_2O_3 \cdot 3.3-3.7H_2O$. A preferred zinc borate preparation is commercially available from US Borax, Inc. under the tradename "FIREBRAKE".

The flame retardant mixture is present in the blends of this invention in quantities comprising between about 10 and 70 wt % (based on total weight of the blend). It is preferred that the range be between about 20 and 55 wt %. Between about 25 and 40 wt % is most preferred. This mixture is comprised of between about 10 and 50 wt % alkaline metal hydroxide or carbonate component and 2 and 20 wt % zinc containing component. Preferably this is between about 15 and 40 wt % alkaline metal hydroxide or carbonate component and between about 3 and 15 wt % zinc component. Most preferred is a mixture between about 20 and 30 wt % alkaline component and between about 4 and 10 wt % zinc component (basis of mixture components is total weight of alkaline metal and zinc components).

Thus, the following relative mounts of polyketone polymer, alkaline metal hydroxide component, zinc component, and glass filler are suitable (expressed in weight percent of the total composition):

|  | Preferred | More Preferred |
|---|---|---|
| Polyketone Polymer | 40–75 | 50–65 |
| Alk. Earth Metal Hydroxide or Carbonate | 15–40 | 20–30 |
| Zinc Component | 3–15 | 4–10 |
| Glass Fiber | 7–30 | 11–25 |

Blends formed in accordance with this invention display improved CTIs relative to polyketone blends comprising polyketone polymer, glass fiber, and an alkaline metal hydroxide or carbonate flame retardant. Flame retardancy is also improved over blends comprising polyketone polymer, glass fiber, and zinc borate. Thus, a method is also presented for improving the CTI and/or flame retardancy of a flame retardant polyketone blend. This method involves the addition of both alkaline metal hydroxide or carbonate and zinc component to a polyketone blend reinforced with glass fiber.

The blends of this invention are produced by mixing the materials throughout the polyketone polymer. The method by which this achieved is not critical to this invention. Good dispersion of the flame retardant generally contributes to good flame retardancy. In one blending procedure, the components are dry blended in particulate form and converted to a substantially uniform composition. Alternatively, the polyketone polymer is heated until molten and the other components are mixed throughout the polymer by use of a high-shear mixer or extruder.

It has also been found that the addition of zinc component provides the blend of this invention a thorough and even light color which is highly desired for some applications. Thus, this blend eliminates the need for additional additive, i.e. pigment, for certain uses. Additionally, due to the light color of the compound, a whole range of pigmented colors is achievable with these blends.

The inventive blend can be processed by conventional methods such as extrusion and injection molding into various articles of manufacture such as electrical connectors, as supporting materials and fasteners for electrical circuitry, and as insulation for wires among other applications.

The invention is further illustrated by the following non-limiting examples.

EXAMPLE 1

(Polyketone Formation)

A terpolymer of carbon monoxide, ethylene, and propylene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.1 measured at 60° C. in m-cresol.

EXAMPLE 2

Blends were prepared of the terpolymer of Example 1, "OCF 408BC" chopped glass commercially available from Owens-Corning, Inc, "MAGNIFIN H10" magnesium hydroxide from Martinswerk GmbH or "ULTRACARB U5" partially hydrated magnesium calcium carbonate from Microfine Minerals Limited, "FIREBRAKE ZB" zinc borate from US Borax, Inc., and "MYVAPLEX 600" a glycerol monostearate processing aid commercially available from Eastman Chemical Co.

The blends were prepared as shown in Table 1 and compounded on a 25 mm Berstorff twin screw extruder operating at a melt processing temperature of between about 250° and 270° C. The speed of the screws was about 200 RPM.

Samples A and E are comparative (not according to this invention) as they do not comprise a zinc component.

The blends were injection molded into ⅛ in. tensile and flexural bars in an Arburg injection molding machine. Extruded strand was used for the assessment of flame retardancy in terms of limiting oxygen index (LOI).

EXAMPLE 3

(CTI)

The CTI of each blend of example 2 was measured according to ASTM D 3638-85 (IEC-112). Ammonium chloride solution (0.1% $NH_4Cl$) was used as the solution dropped on the blend. CTI values are reported in Table 1 below.

This example illustrates the substantial improvement in the CTI of blends made according to this invention (having both a zinc borate and alkaline earth metal hydroxide or carbonate) relative to blends without the flame retardant mixture of this invention.

EXAMPLE 4

(Flame Testing)

Standard test method ASTM D2863-77 was used to evaluate the burning behavior of the blends of example 2. This test measures the minimum concentration of oxygen in an oxygen-nitrogen atmosphere that is necessary to initiate and support a flame for 180 seconds on a test specimen. The result of the test is expressed as the percentage of oxygen in the oxygen-nitrogen atmosphere and is called the Limiting Oxygen Index (LOI) of the composition. LOIs are reported in Table 1 below. Each of the blends is seen to display good flame retardancy, as evidenced by LOI>28%

EXAMPLE 5

(Physical Testing)

Impact, flexural, and tensile properties of the blends of example 2 are shown below in Table 2.

This example shows that the advantages of the invention were achieved without significant loss of mechanical properties.

TABLE 1

Flammability and Tracking Resistance

| Sample* | Concentration Zinc Borate (% wt) | Flame Retardant** | LOI (% O2) | UL CTI (V) |
|---|---|---|---|---|
| A | 0 | H10 | >40 | 375 |
| B | 4 | H10 | 35 | 575 |
| C | 7 | H10 | 34 | >600 |
| D | 10 | H10 | 35 | >600 |
| E | 0 | U5 | 31 | 350 |
| F | 4 | U5 | 32.5 | 575 |
| G | 7 | U5 | 30 | 575 |
| H | 10 | U5 | 30 | >600 |

*All samples contain:
15 wt% "OCF 408BC" chopped glass fibers
25 wt% magnesium hydroxide or partially hydrated magnesium calcium carbonate
0.5 wt% "Myvaplex 600" glycerol monosterate
1 wt% tricalcium phosphate as a melt stabilizer
**H10 = "Magnefin H10" magnesium hydroxide, U5 = "Ultracarb U5" partially hydrated magnesium calcium carbonate

TABLE 2

| | Mechanical Properties | | | | | |
|---|---|---|---|---|---|---|
| Sample | Tensile Strength (kpsi) | Elongation @ Break % | Tensile Modulus (kpsi) | Flexural Modulus (kpsi) | Flexural Strength (kpsi) | Notched Izod Impact Strength (ft-lb/in) |
| A | 9.2 | 4.3 | 790 | 675 | 15.8 | 1.2 |
| B | 9.6 | 3.9 | 875 | 740 | 16.4 | 1.3 |
| C | 9.3 | 3.7 | 900 | 750 | 15.9 | 1.2 |
| D | 9.3 | 3.4 | 980 | 825 | 16.2 | 1.2 |
| E | 9.5 | 4.4 | 820 | 700 | 16.4 | 1.4 |
| F | 9.3 | 4.1 | 880 | 730 | 16.1 | 1.3 |
| G | 8.7 | 3.0 | 890 | 760 | 15.6 | 1.3 |
| H | 7.6 | 2.9 | 810 | 760 | 14.3 | 1.2 |

We claim as our invention:

1. A polyketone polymer blend comprising a major amount of polyketone polymer, a minor amount of glass, and a minor amount of a flame retardant mixture which contain as essential ingredients between about 20 and 30% wt (based on total weight of the blend) alkaline earth metal hydroxide or carbonate and between about 4 and 10% wt (based on total weight of the blend) zinc oxide or zinc containing derivative.

2. The blend of claim 1 wherein said zinc containing derivative is zinc borate.

3. The blend of claim 1 further comprising a processing aid.

4. The blend of claim 3 wherein said processing aid is a minor amount of fatty acid or derivative thereof.

5. The blend of claim 2 wherein said flame retardant mixture comprises magnesium hydroxide or partially hydrated magnesium calcium carbonate and zinc borate.

* * * * *